(12) United States Patent
Tanahashi

(10) Patent No.: US 7,529,623 B2
(45) Date of Patent: May 5, 2009

(54) WEATHER PREDICTING APPARATUS, AND WEATHER PREDICTING METHOD, COMPUTER PRODUCT

(75) Inventor: Shuichi Tanahashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 134 days.

(21) Appl. No.: 11/489,563

(22) Filed: Jul. 20, 2006

(65) Prior Publication Data

US 2007/0244644 A1    Oct. 18, 2007

(30) Foreign Application Priority Data

Apr. 13, 2006   (JP) .............................. 2006-111260

(51) Int. Cl.
*G01W 1/00*   (2006.01)
(52) U.S. Cl. ......................................................... 702/3
(58) Field of Classification Search .................. 702/1–4, 702/189; 706/12, 21; 725/37
See application file for complete search history.

(56) References Cited

U.S. PATENT DOCUMENTS

| | | | |
|---|---|---|---|
| 6,546,378 B1 * | 4/2003 | Cook ........................... | 706/12 |
| 6,792,615 B1 * | 9/2004 | Rowe et al. .................... | 725/37 |
| 6,988,056 B2 * | 1/2006 | Cook .......................... | 702/189 |
| 7,069,258 B1 * | 6/2006 | Bothwell ...................... | 706/21 |

FOREIGN PATENT DOCUMENTS

JP    2003-090888    3/2003

* cited by examiner

*Primary Examiner*—Tung S Lau
*Assistant Examiner*—Xiuquin Sun
(74) *Attorney, Agent, or Firm*—Staas & Halsey LLP

(57) ABSTRACT

A weather predicting apparatus computes predicted values indicative of the weather at predetermined time intervals after a predetermined time point in the past based on each initial value, and compares each predicted value with a corresponding actual value in the past. When the difference between the two is determined to be out of the tolerance, the weather predicting apparatus terminates computation of the initial value so that it will not be used for the prediction.

9 Claims, 13 Drawing Sheets

FIG.3

23$^{RD}$ DAY 19:00

| AREA A-1 | | | |
|---|---|---|---|
| | TEMPERATURE | PRECIPITATION | WIND SPEED |
| INITIAL VALUE 2 | 8.5 | 0.0 | 2.8 |
| INITIAL VALUE 2 | 8.0 | 10.0 | 2.75 |
| INITIAL VALUE 3 | 9.0 | 10.0 | 2.85 |
| ⋮ | ⋮ | ⋮ | ⋮ |

WEATHER PREDICTING APPARATUS, AND WEATHER PREDICTING METHOD, COMPUTER PRODUCT

BACKGROUND OF THE INVENTION

1. Field of the Invention

The present invention generally relates to a technology for predicting weather by using a weather prediction model, and specifically relates to deciding parameters to be used in the weather prediction model.

2. Description of the Related Art

Japanese Patent Laid-Open No. 2003-90888 discloses use of a numerical model for predicting weather. In this approach, various meteorological data are input into the numerical model, as initial values, to simulate certain arithmetic results, and predict weather at certain time in future from the arithmetic results.

The numerical prediction includes an ensemble forecast for obtaining better results. In the ensemble forecast, an average of the arithmetic results (hereinafter, members) obtained at various stages in calculated and the average is used to predict weather.

However, conventionally, because all of the assigned initial values are used in the calculation of the arithmetic results, the calculation takes extremely long time and requires high-capacity computing facilities. Moreover, some of the initial parameters can be inaccurate so that the members relating to those inaccurate initial parameters also become inaccurate thereby making the ensemble forecast inaccurate.

SUMMARY OF THE INVENTION

It is an object of the present invention to at least partially solve the problems in the conventional technology.

According to an aspect of the present invention, a weather predicting apparatus includes a computing unit that computes a predicted value indicative of weather at a plurality of time points from a first time point in the past with respect to each initial value; an acquiring unit that acquires actual values actually observed at each of the time points; a comparing unit that compares the predicted value at any specific time point with an actual value at the specific time point and determines whether a difference between the predicted value and the actual values is within a tolerance; and a deleting unit that deletes those initial values for which the comparing unit determines that the difference is out of the tolerance; and a calculating unit that substitute remaining initial values into a weather prediction model for performing weather prediction at a second time point in future.

According to another aspect of the present invention, a weather predicting method includes computing a predicted value indicative of weather at a plurality of time points from a first time point in the past with respect to each initial value; acquiring actual values actually observed at each of the time points; comparing the predicted value at any specific time point with an actual value at the specific time point and determining whether a difference between the predicted value and the actual values is within a tolerance; repeating the comparing for all the time points; and deleting those initial values for which it is determined at the comparing that the difference is out of the tolerance; and substituting remaining initial values into a weather prediction model for performing weather prediction at a second time point in future.

According to still another aspect of the present invention, a computer-readable recording medium stores therein a computer program that causes a computer to implements the above method.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is an example of the contents of an initial value database shown in FIG. 2;

DETAILED DESCRIPTION OF THE PREFERRED EMBODIMENTS

Exemplary embodiments of the present invention are explained below in detail referring to the accompanying drawings. The present invention is not limited to the embodiments explained below.

Figure 1:
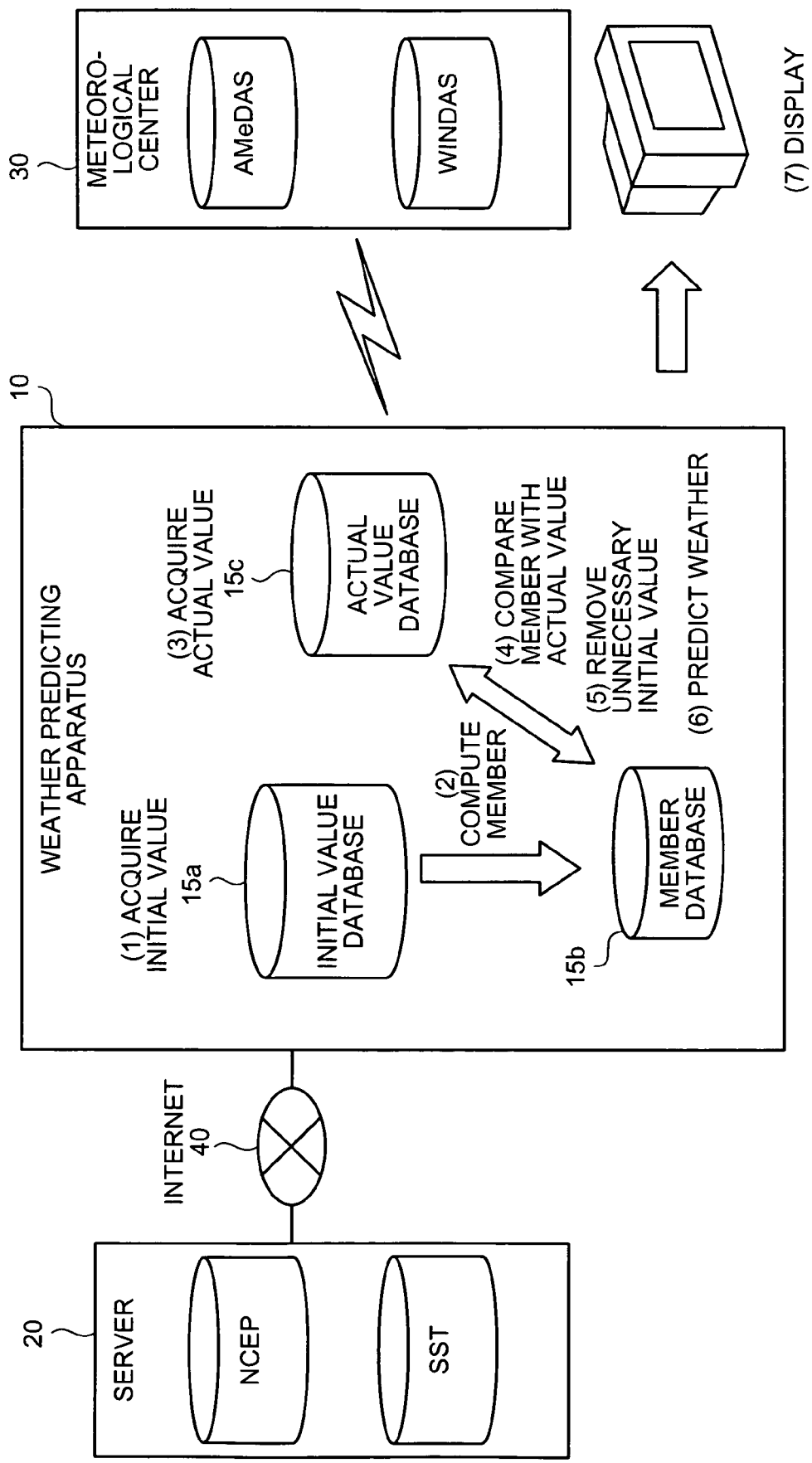
FIG. 1 is a schematic for explaining the outline and the features of a weather predicting apparatus according to a first embodiment of the present invention.

FIG. 1 is a schematic for explaining the outline and the features of a weather predicting apparatus 10 according to a first embodiment of the present invention. The weather predicting apparatus 10 includes an initial value database 15a, a member database 15b, and an actual value database 15c.

The initial value database 15a stores therein a plurality of different initial values. The member database 15b stores therein members including results of predictions at predetermined time intervals from a time point in the past based on each of the initial values. The actual value database 15c stores therein values acquired from an actual observation.

The weather predicting apparatus 10 acquires meteorological data from a server 20, a meteorological center 30 or the like, and stores the meteorological data in the initial value database 15a as initial values (see (1) in FIG. 1). The meteorological data includes, for example, data from National Centers for Environmental Prediction (NCEP) that is the latest global weather prediction data available through the Internet, sea surface temperature (SST) data, and the like.

More specifically, the weather predicting apparatus 10 stores the acquired meteorological data and data slightly modified from the acquired meteorological data in the initial value database 15a as the initial values. The weather predicting apparatus 10 can use a global spectral model (GSM) or a regional spectral model (RSM) as the initial value instead of the data from NCEP. The GSM is a numerical weather prediction model provided by Japan Meteorological Agency that covers the globe, and RSM is another numerical weather prediction model provided by Japan Meteorological Agency that covers East Asia centered in Japan. The weather predicting apparatus 10 can acquire the meteorological data from Automated Meteorological Data Acquisition System (AMeDAS) or Wind Profiler Network and Data Acquisition System (WINDAS), and reflects the data to the initial values.

The weather predicting apparatus 10 computes a predicted value of the weather at a certain time point in the past, such as six hours before the present time, with respect to each initial value stored in the initial value database 15a, and stores the result as members in the member database 15b (see (2) in FIG. 1).

The weather predicting apparatus 10 acquires the actual observed values from the server 20 or the meteorological center 30, and stores those values in the actual value database 15c at predetermined time intervals (see (3) in FIG. 1). Every time the prediction is computed at the predetermined time intervals, the weather predicting apparatus 10 compares an actual value from the actual value database 15c with a corresponding member in the member database 15b, and determines whether the difference between the two (hereinafter, "prediction error") is within a predetermined range (hereinafter, "tolerance") (see (4) in FIG. 1). For example, the weather predicting apparatus 10 acquires an actual observed value that was observed six hours ago, compares the actual value with a corresponding member corresponding to prediction of six hours ago, and determines whether the prediction error is within the tolerance.

If the prediction error with any member is determined to be out of the tolerance, the weather predicting apparatus 10 terminates computation of the initial value corresponding to the member so that the initial value is not used for the prediction (see (5) in FIG. 1). More specifically, the weather predicting apparatus 10 deletes the member and corresponding initial value from the member database 15b and the initial value database 15a respectively. The weather predicting apparatus 10 performs the process of determining whether the weather prediction computed at predetermined time intervals (such as one hour) is within the tolerance to all of the members.

The weather predicting apparatus 10 computes an average of the computed members to predict the weather (see (6) in FIG. 1). More specifically, the weather predicting apparatus 10 acquires members that are within the tolerance from the member database 15b, and computes the average of the tolerable members to predict the weather. The weather predicting apparatus 10 then displays the result of the weather prediction and the number of members that were determined to be out of the tolerance on an output unit (see (7) in FIG. 1).

In this manner, the weather predicting apparatus 10 identifies inaccurate results of the operation based on the actual value, deletes the inaccurate results so that only accurate results are used for weather prediction. As a result, the number of initial values used in the weather prediction is reduced so that the processing load reduces. Moreover, because only accurate initial values in the weather prediction, the accuracy of the weather prediction improves.

Figure 2:
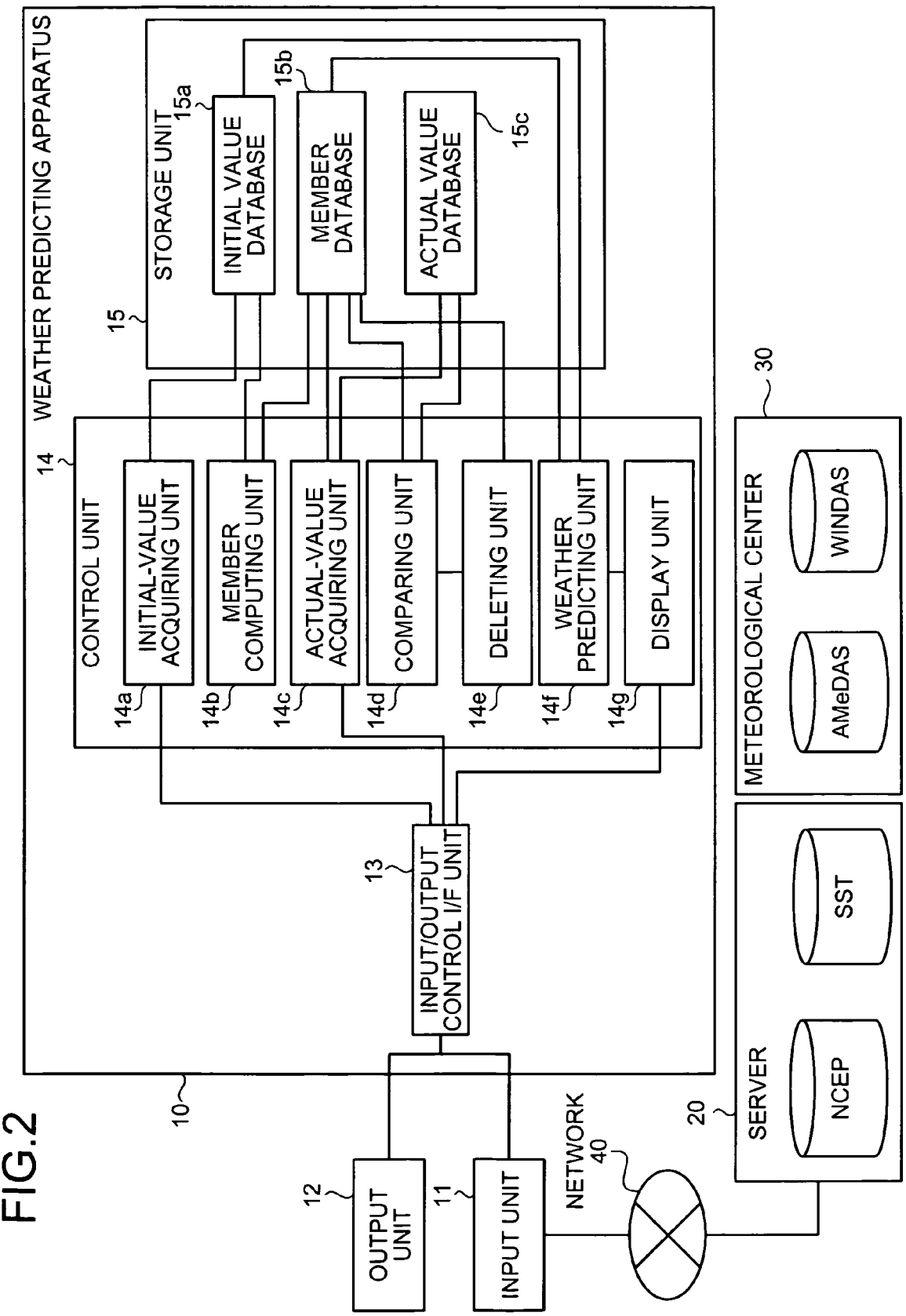
FIG. 2 is a detailed block diagram of the weather predicting apparatus shown in FIG. 1.
Figure 4:
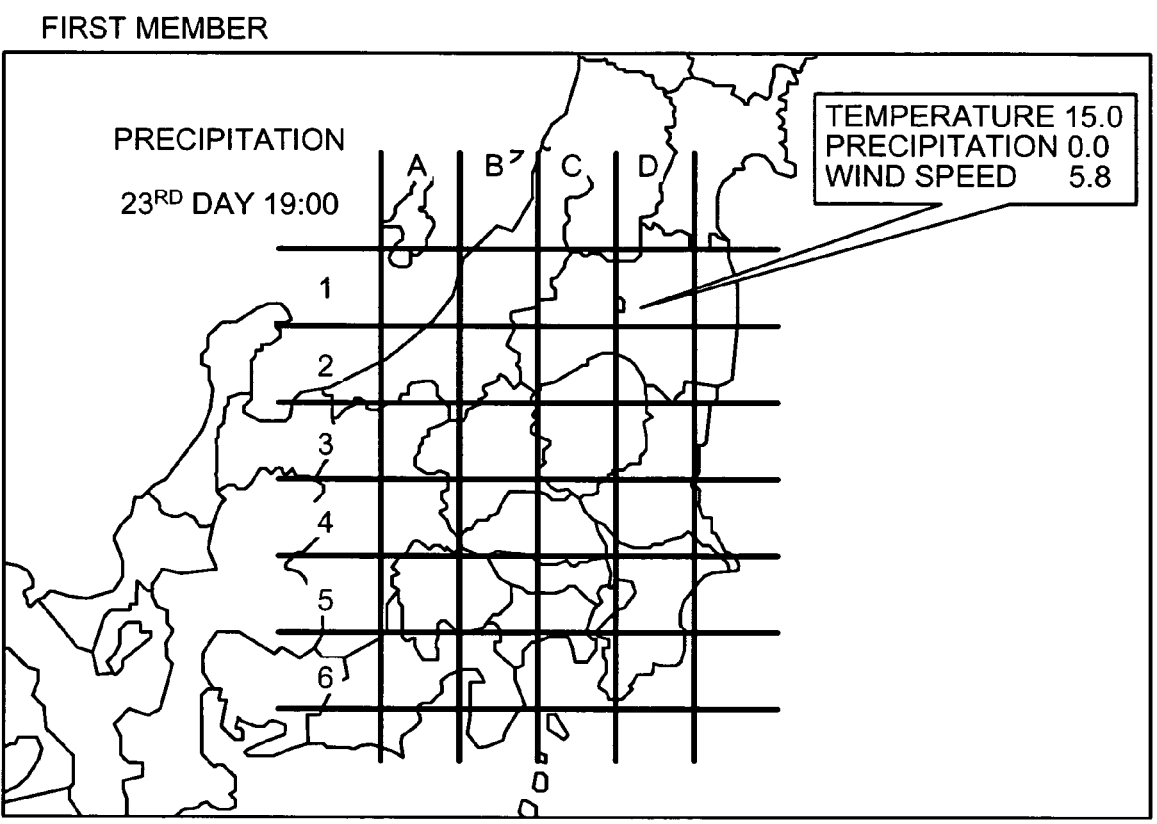
FIG. 4 is a schematic for explaining the contents of a member database shown in FIG. 2.
Figure 5:
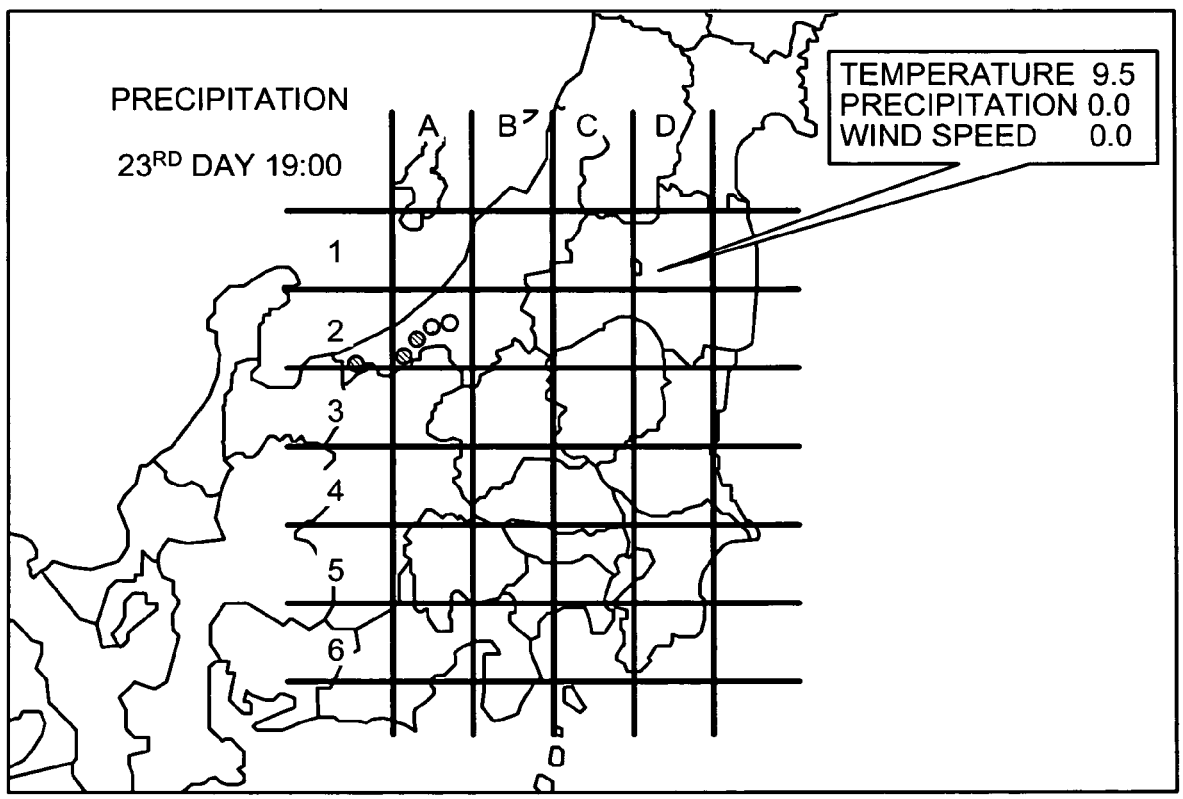
FIG. 5 is a schematic for explaining the contents of an actual value database shown in FIG. 2.
Figure 6:
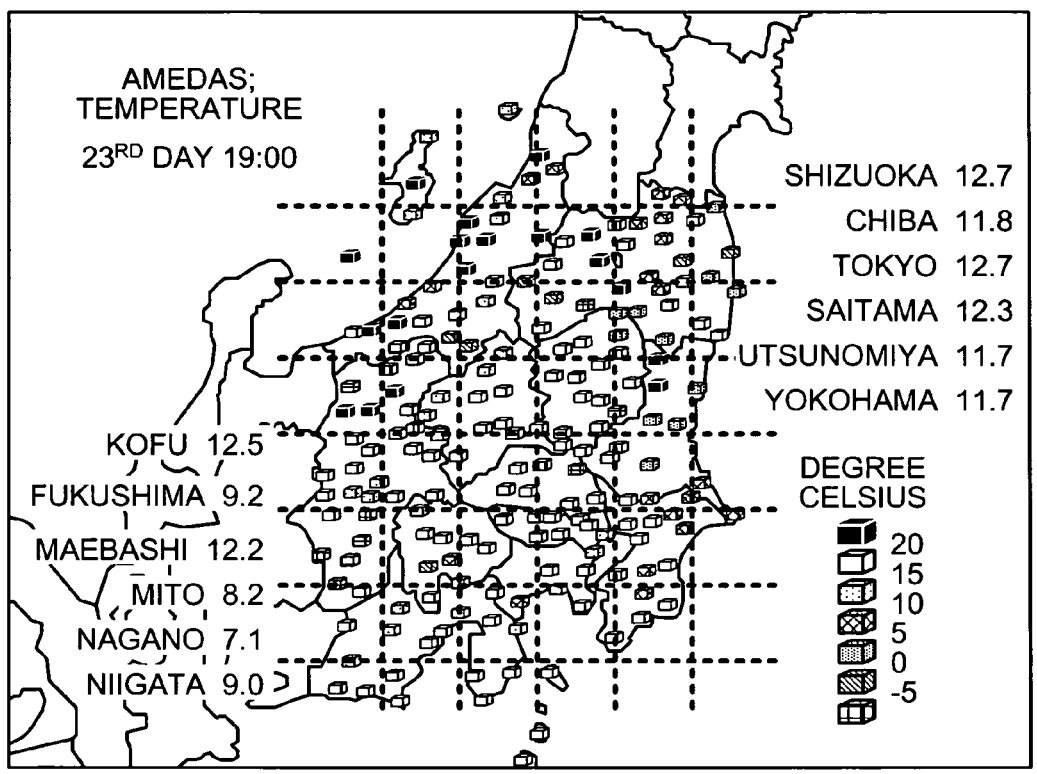
FIGS. 6 to 8 are examples of information that the weather predicting apparatus acquires from the Automated Meteorological Data Acquisition System (AMeDAS)
Figure 7:
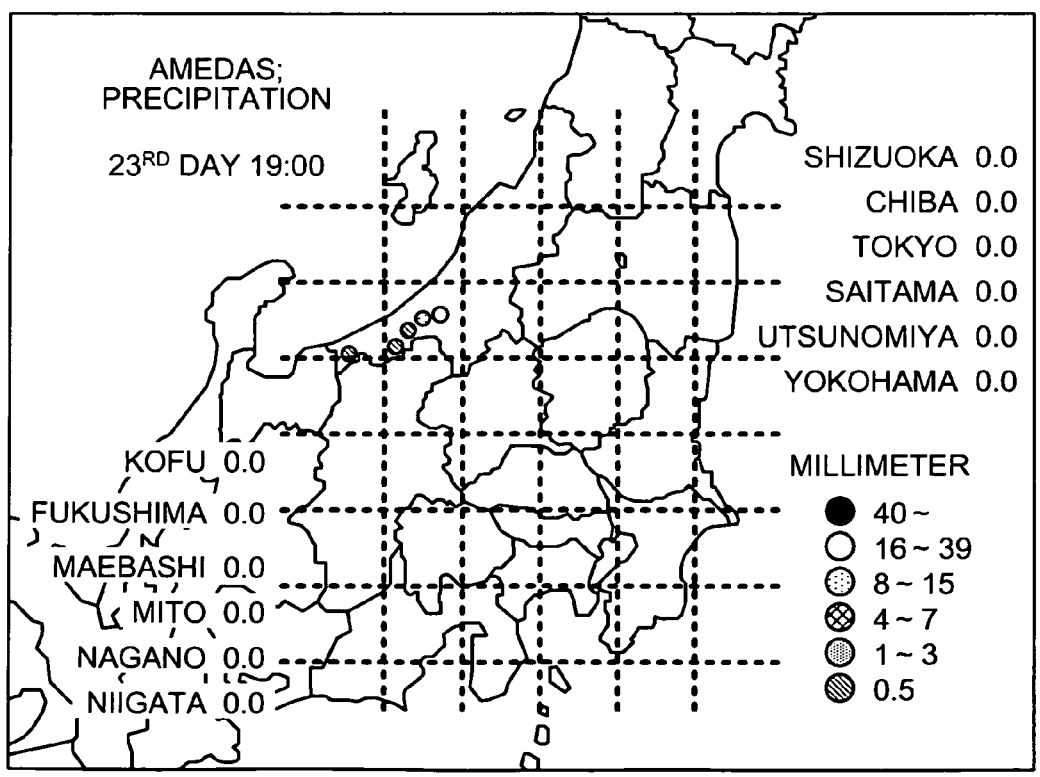
Figure 8:
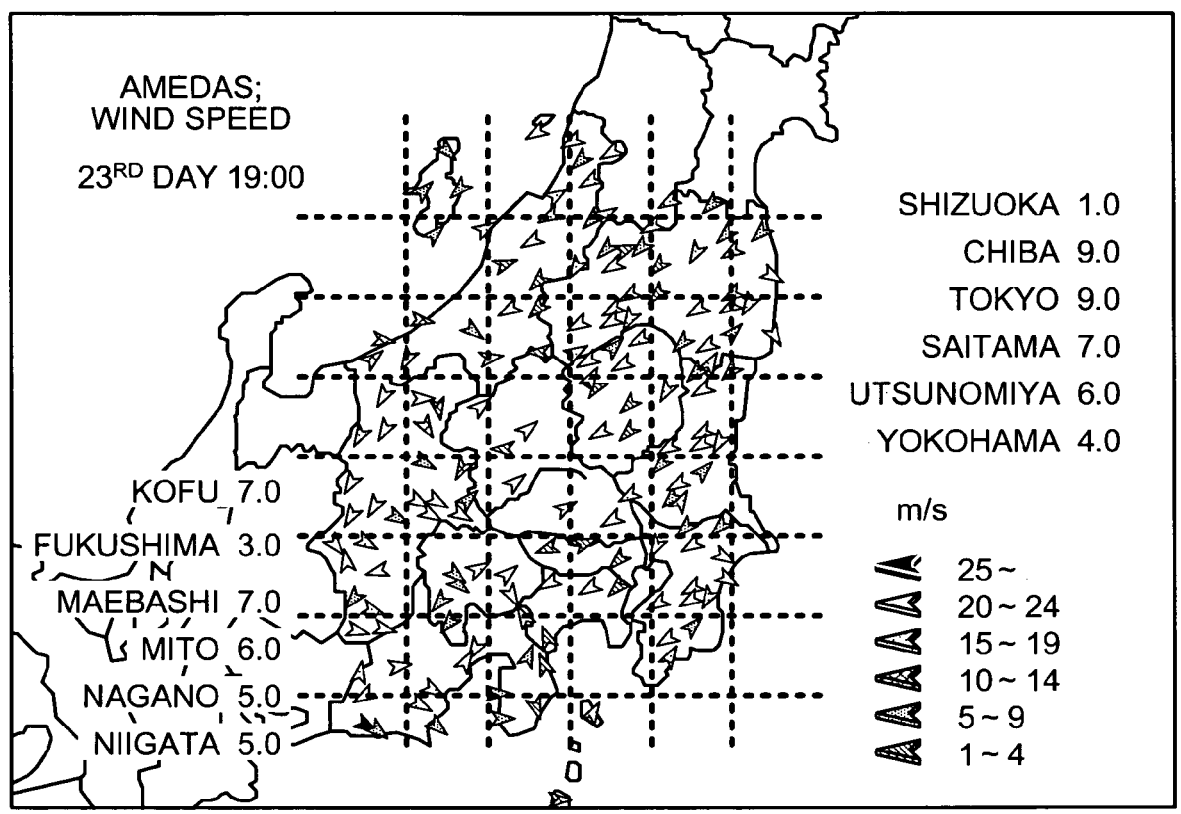
Figure 9:
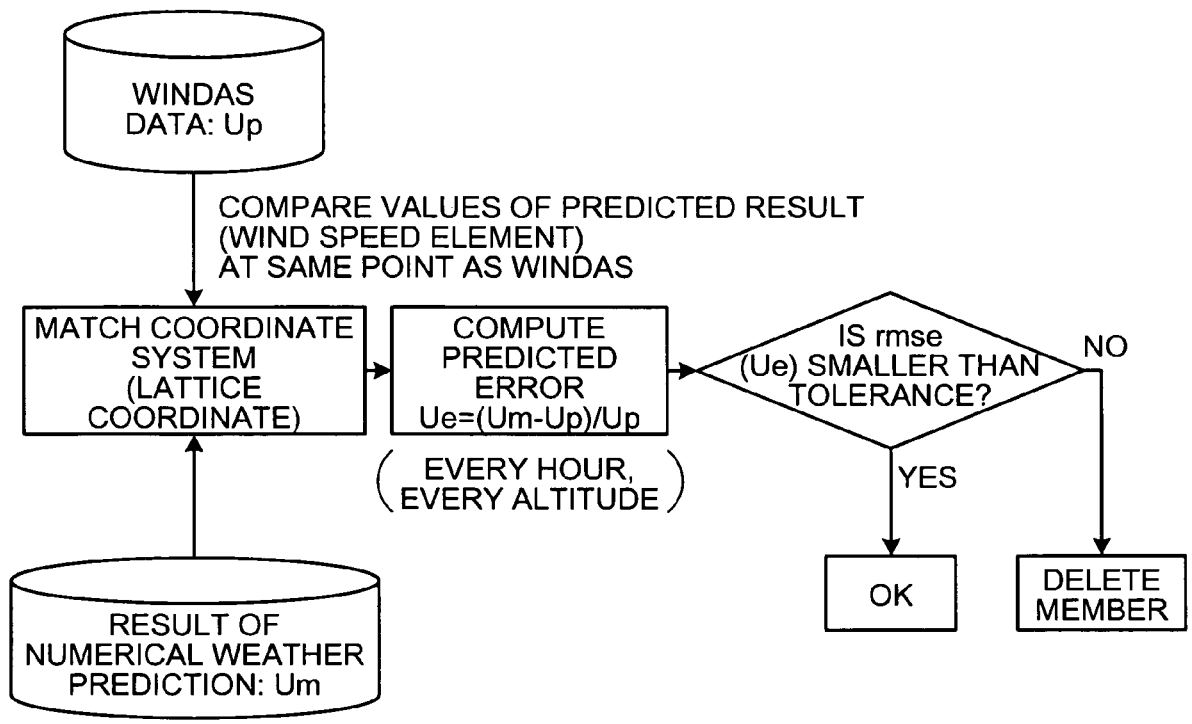
FIG. 9 is a schematic for explaining a process of comparison between an actual value and members.
Figure 10:
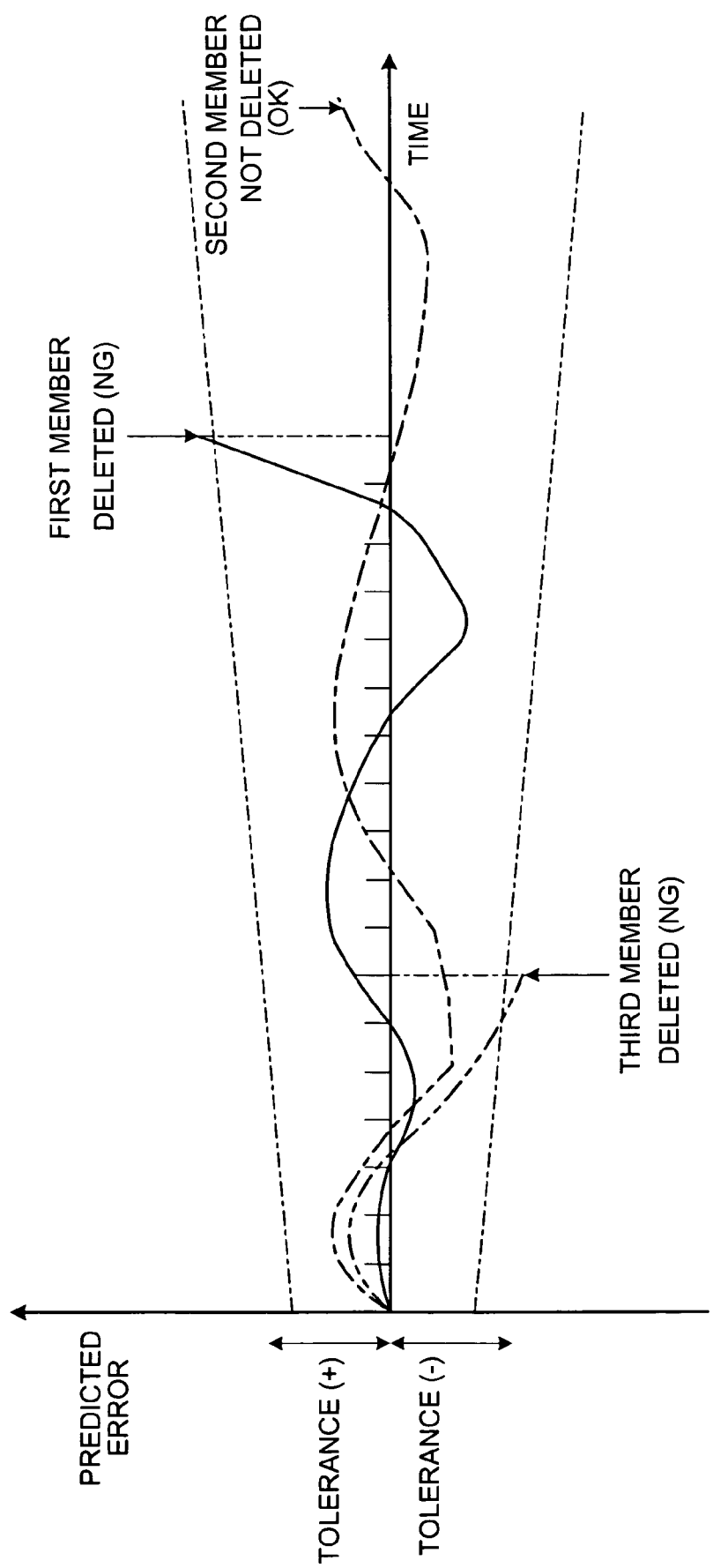
FIG. 10 is a chart for explaining the comparison between the actual value and the members.

FIG. 2 is a detailed block diagram of the weather predicting apparatus 10; FIG. 3 is an example of the contents of the initial value database 15a; FIG. 4 is a schematic for explaining the contents of the member database 15b; FIG. 5 is a schematic for explaining the contents of the actual value database 15c; FIGS. 6 to 8 are examples of information provided from an Automated Meteorological Data Acquisition System (AMeDAS); and FIGS. 9 and 10 are schematics for explaining a process of comparison between the actual value and members.

The weather predicting apparatus 10 includes an input unit 11, an output unit 12, an input/output control interface (I/F) unit 13, a control unit 14, and a storage unit 15. The weather predicting apparatus 10 is connected to the server 20 and the meteorological center 30 via a network 40 such as the Internet.

The input unit 11 is used to input various types of information, and can be an operation panel, switches, buttons, or the like. More specifically, the input unit 11 receives initial values, actual values, and the like from an operator, and inputs them to the weather predicting apparatus 10.

The output unit 12 outputs various types of information. More specifically, the output unit 12 includes a display unit or an operation panel, a speaker, a lamp, and the like, and displays the result of the weather prediction and the number of members that were determined to be out of the tolerance on a predetermined output unit (not shown).

The input/output control I/F unit 13 controls data transfer between either the input unit 11 or the output unit 12 and either the control unit 14 or the storage unit 15.

The storage unit 15 stores therein data and computer programs required for processes performed by the control unit 14. More specifically, the storage unit 15 includes the initial value database 15a, the member database 15b, and the actual value database 15c.

The initial value database 15a stores therein a plurality of initial values for each meteorological parameter. More specifically, the initial value database 15a stores therein meteorological data acquired by an initial-value acquiring unit 14a and data slightly modified from the acquired meteorological data as the initial value. For example, the initial value database 15a stores therein, as shown in FIG. 3, different types of the meteorological data such as the NCEP data, the SST, the temperature, the precipitation, and the wind speed grouped as the initial value at each time point and each area.

The member database 15b stores therein members, i.e. the predicted values at predetermined time intervals after the predetermined time point in the past computed with respect to each initial value. More specifically, the member database 15b stores therein each member computed by a member computing unit 14b. For example, as shown in FIG. 4, the member database 15b stores therein predicted values of the temperature, the precipitation, and the wind speed at each time point and each area as a member.

The actual value database 15c stores therein actual values acquired through actual meteorological observations. More specifically, the actual value database 15c stores therein actual values acquired by an actual-value acquiring unit 14c. For example, as shown in FIG. 5, the actual value database 15c stores therein the actual values of the temperature, the precipitation, and the wind speed observed at each time point and each area.

The control unit 14 includes a memory (not shown) that temporarily stores therein the computer programs and data required for various processes, and performs the processes based on the computer programs and data. More specifically, the control unit 14 includes the initial-value acquiring unit 14a, the member computing unit 14b, the actual-value acquiring unit 14c, a comparing unit 14d, a deleting unit 14e, a weather predicting unit 14f, and a display unit 14g.

The initial-value acquiring unit 14a acquires a plurality of different initial values. More specifically, the initial-value acquiring unit 14a acquires initial values from the server 20 and the meteorological center 30, slightly modifies the initial values, and stores both initial and modified values in the initial value database 15a. For example, the initial-value acquiring unit 14a acquires the meteorological data such as the NCEP data and the SST as the initial values. The initial-value acquiring unit 14a can also acquire the meteorological data from AMeDAS and WINDAS as shown in FIGS. 6 to 8 and reflect them to the initial data.

The member computing unit 14b computes the members based on each initial value at each predetermined time interval after the predetermined time point in the past. More specifically, the member computing unit 14b acquires an initial value from the initial value database 15a, inputs the initial value to a weather prediction model such as the Pennsylvania State University/National Center for Atmospheric Research mesoscale model (MM5) to compute a predicted value of the weather, and stores the value in the member database 15b.

The actual-value acquiring unit 14c acquires actual values acquired through actual observations. More specifically, the actual-value acquiring unit 14c stores the actual values from the server 20 and the meteorological center 30 in the actual value database 15c.

The comparing unit 14d compares, every time a predicted value is computed after the predetermined time interval, each member with the actual value and determines whether the prediction error is within a predetermined tolerance. More specifically, the comparing unit 14d acquires the member from the member database 15b, acquires the actual value from the actual value database 15c, and determines whether the difference between the two values is within the predetermined tolerance.

For example, as shown in FIG. 9, the comparing unit 14d acquires a member (herein, a wind speed element Um) from the member database 15b; acquires a meteorological data (herein, a wind speed Up from WINDAS) from the actual value database 15c; computes a prediction error Ue that is the difference between the actual value and a predicted value indicative of the wind speed at the same point, the same time point, and the same altitude as the actual value; and determines whether the prediction error is tolerable. More specifically, the comparing unit 14d subtracts each of the actual values from the corresponding one of the members, and divides the total of the differences by the number of the actual values ($Ue=(Um-Up)/Up$ in FIG. 9) to find an average error (rmse in FIG. 9).

The comparing unit 14d determines, as shown in FIG. 10, whether the prediction error of each member is out of the tolerance. A member determined to be out of the tolerance will not be processed any more. For example, in FIG. 10, when each prediction error of a first member and a third member exceeds the tolerance, the comparing unit 14d immediately stops processing each member. Because prediction errors tend to increase when the weather in farther future is predicted, the weather predicting apparatus 10 increases the tolerance for the weather prediction at a farther time point into the future. This prevents the initial value of an accurate member from being excluded from the processing.

The deleting unit 14e deletes an initial value of a member whose prediction error is determined to be out of the tolerance. More specifically, the deleting unit 14e deletes the member whose prediction error is determined to be out of the tolerance by the comparing unit 14d and the initial value of the member from the initial value database 15a and the member database 15b respectively so that the values are not processed for the prediction.

The weather predicting unit 14f computes an average of the members computed at the predetermined time intervals. More specifically, the weather predicting unit 14f acquires members from the member database 15b, and averages the members to predict the weather.

The display unit 14g displays the result of the weather prediction and the number of members whose prediction errors were determined to be out of the tolerance. More specifically, the display unit 14g displays the weather prediction produced by the weather predicting unit 14f and the number of the members that were deleted by the deleting unit 14e.

Figure 11:
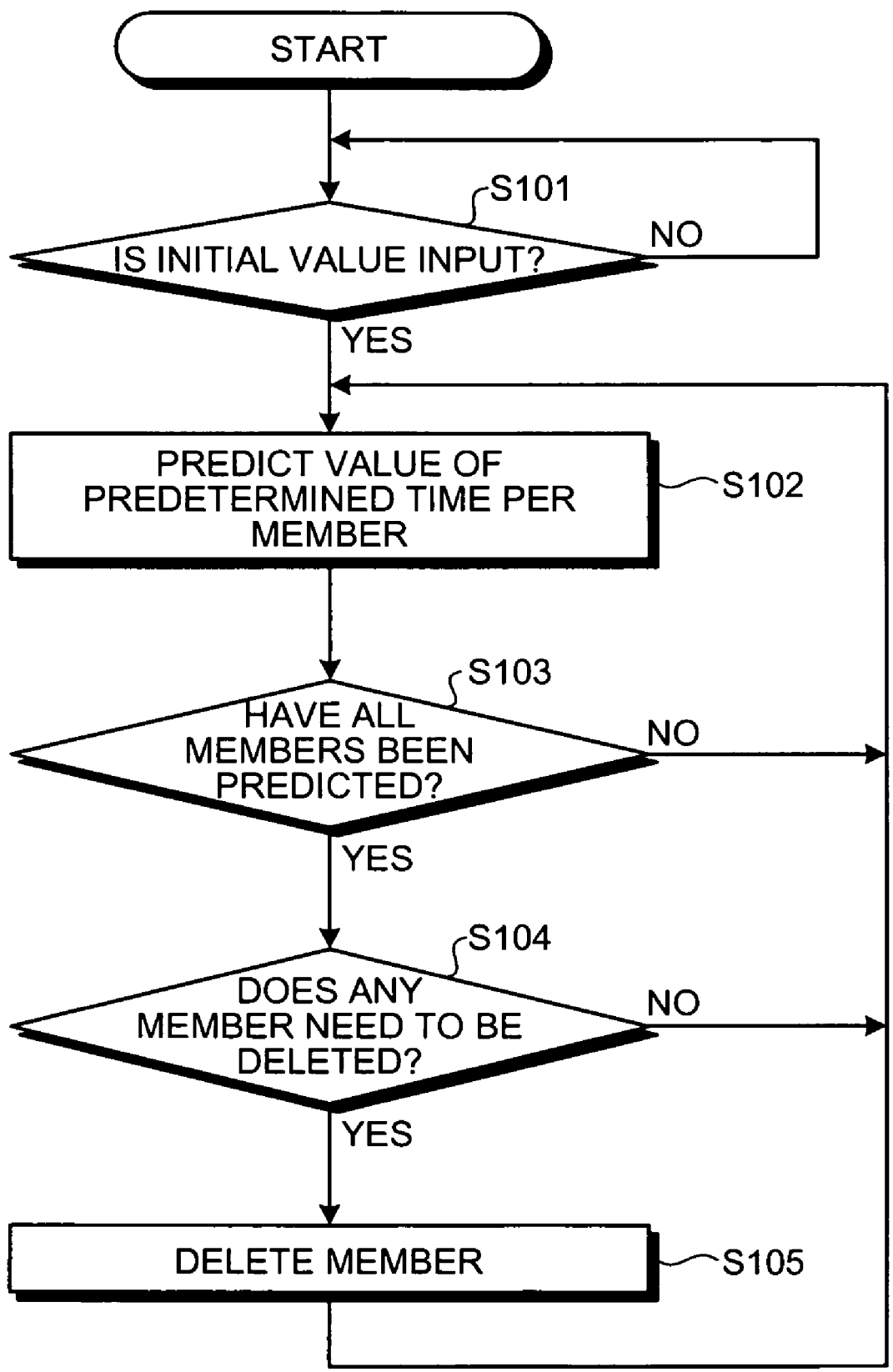
FIG. 11 is a flowchart of a prediction process performed by the weather predicting apparatus shown in FIG. 2.

FIG. 11 is a flowchart of a prediction process performed by the weather predicting apparatus 10. When such data as those from AMeDAS is input from the server 20 and the meteorological center 30 via the input/output control I/F unit 13 (YES at step S101), the weather predicting apparatus 10 computes predicted values at the certain time point in the past, such as six hours before the present time, with respect to each member (step S102).

The weather predicting apparatus 10 determines whether all the members have been predicted (step S103). If not all the members have been predicted (NO at step S103), the weather predicting apparatus 10 repeats the step S102 until all the members are predicted. If all the members have been predicted (YES at step S103), the weather predicting apparatus 10 determines whether any of the members needs to be deleted (step S104). If there is any member to be deleted (YES at step S104), the weather predicting apparatus 10 deletes the member (step S105). After the predetermined time interval, the weather predicting apparatus 10 computes the predicted value of each member and repeats the process.

Figure 12:
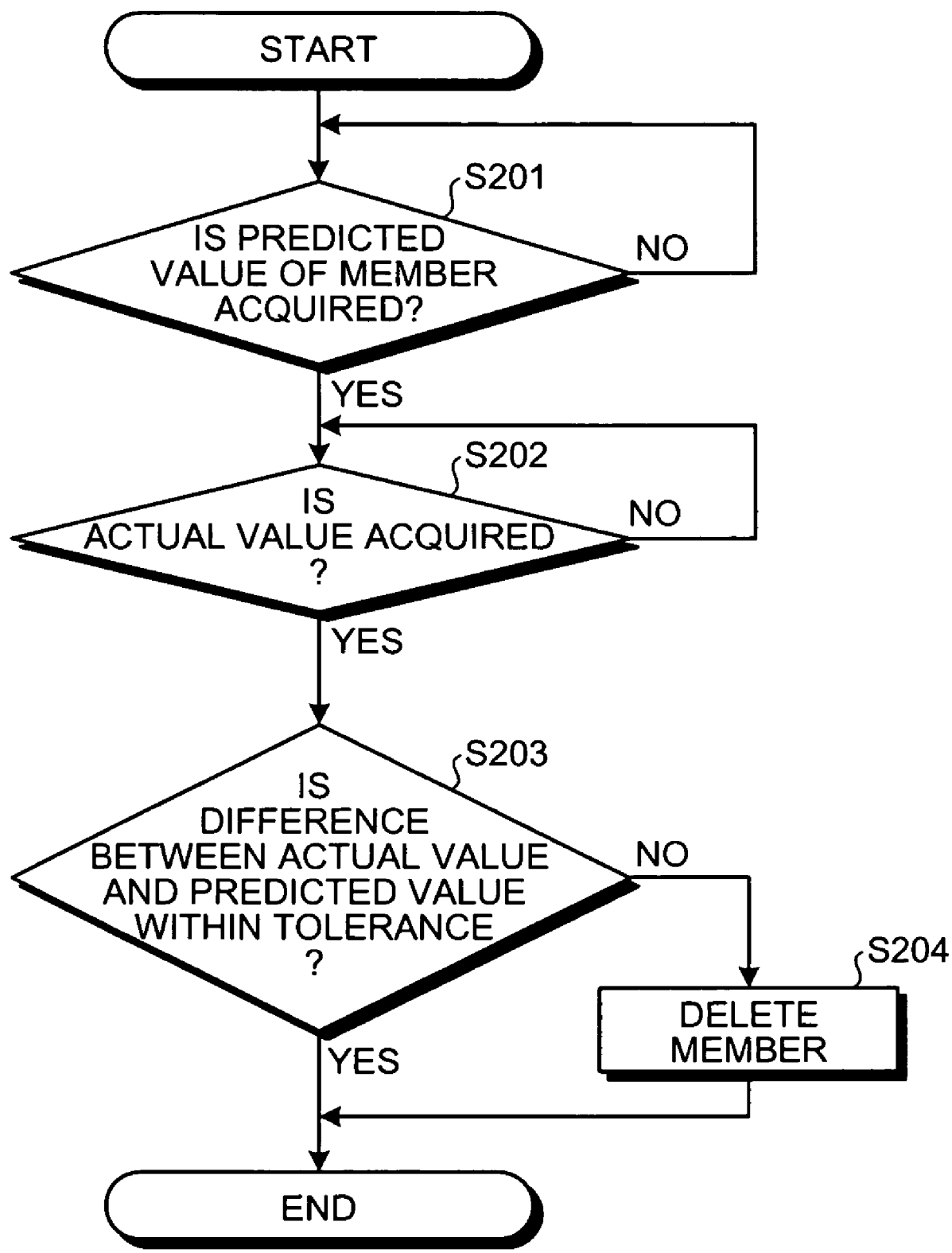
FIG. 12 is a flowchart of a comparison process performed by the weather predicting apparatus.

FIG. 12 is a flowchart of a comparison process performed by the weather predicting apparatus 10. When the weather predicting apparatus 10 acquires the predicted value of any one member (YES at step S201), the weather predicting apparatus 10 acquires an actual value corresponding to the member (YES at step S202), and determines whether the prediction error of the member is within the predetermined tolerance (step S203).

If the prediction error is determined to be out of the tolerance (NO at step S203), the weather predicting apparatus 10 deletes the corresponding member and the initial value to stop processing them (step S204), and terminates the process. On the other hand, if the prediction error is determined to be tolerable (YES at step S203), the weather predicting apparatus 10 terminates the process without deleting any value.

Figure 13:
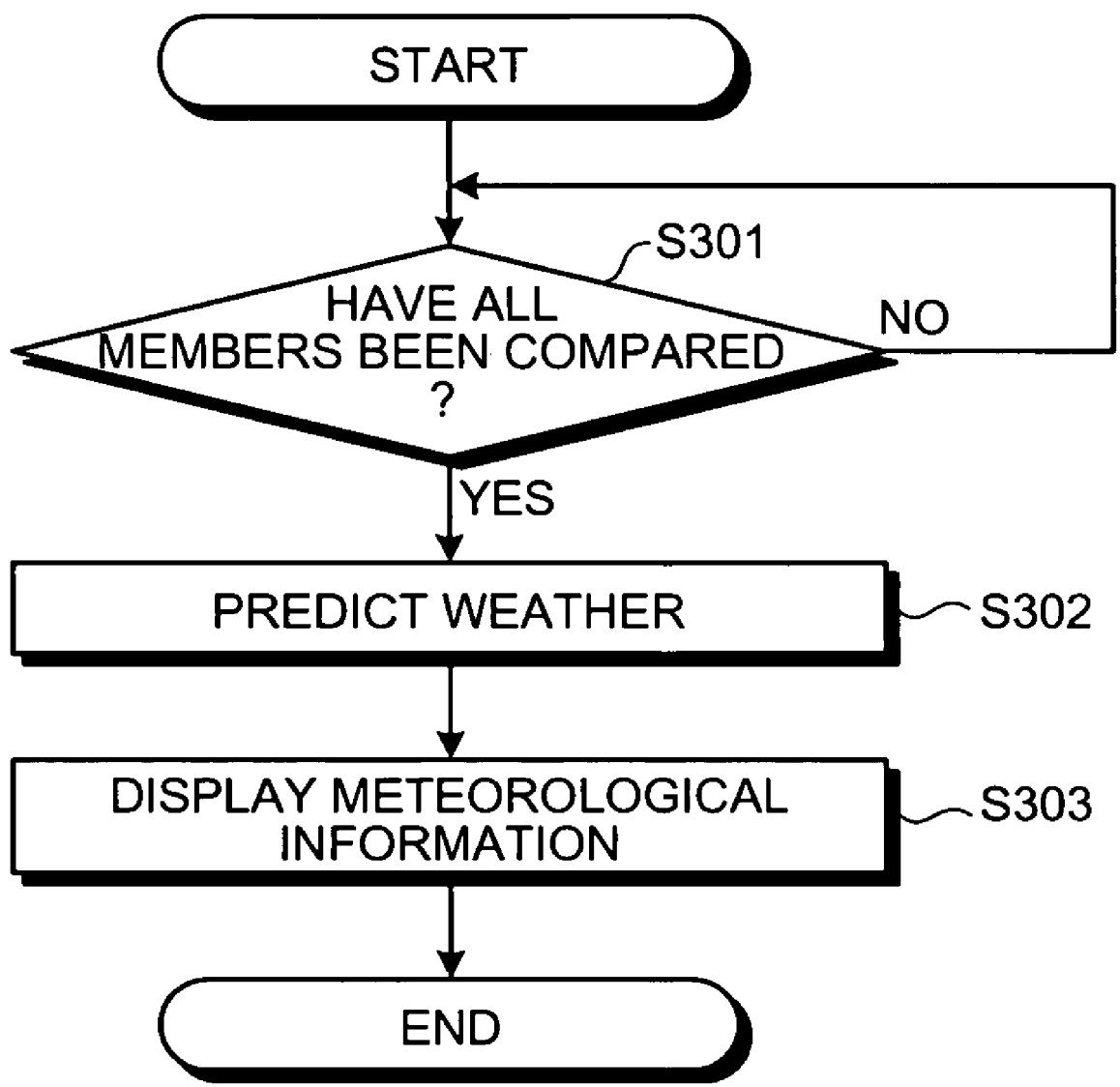
FIG. 13 is a flowchart of a displaying process performed by the weather predicting apparatus.

FIG. 13 is a flowchart of a displaying process performed by the weather predicting apparatus 10. When the comparison of all the members is terminated (step S301), the weather predicting apparatus 10 computes an average of the remaining members and predicts the weather (step S302). The display unit 14g displays the result of the weather prediction produced by the weather predicting unit 14f and the number of the members whose prediction errors were determined to be out of the tolerance (step S303).

While the first embodiment was explained above, the present invention can be carried out in other forms.

(1) Warning

The weather predicting apparatus 10 can be configured to issue a warning when an inaccurate prediction of a member greatly deviates from the actual value or many members produce out of the tolerance predictions. More specifically, the weather predicting apparatus 10 can warn a user by sounding an alarm or sending an email, when the prediction error of the inaccurate member exceeds a predetermined threshold or the number of the members that produce the out of the tolerance predictions exceeds a specified number.

In this manner, the weather predicting apparatus 10 can notify the user when the weather prediction is difficult.

(2) System Configuration

Each component in each unit is based on a functional concept, and does not need to be physically configured as shown in the drawings. In other words, all or part of the components can be physically integrated or separated. For example, the initial value acquiring unit 14a and the member computing unit 14b can be integrated. All or part of processing functions performed by respective units can be also realized by a central processing unit (CPU), a computer program executed by the CPU, or hardware based on wired logic.

All or part of the processes explained to be performed automatically can be performed manually, and vice versa. The processing procedures, controlling procedures, specific names, information including various data and parameters described above or shown in the drawings can be changed arbitrarily except otherwise specified.

(3) Computer Program

Figure 14:
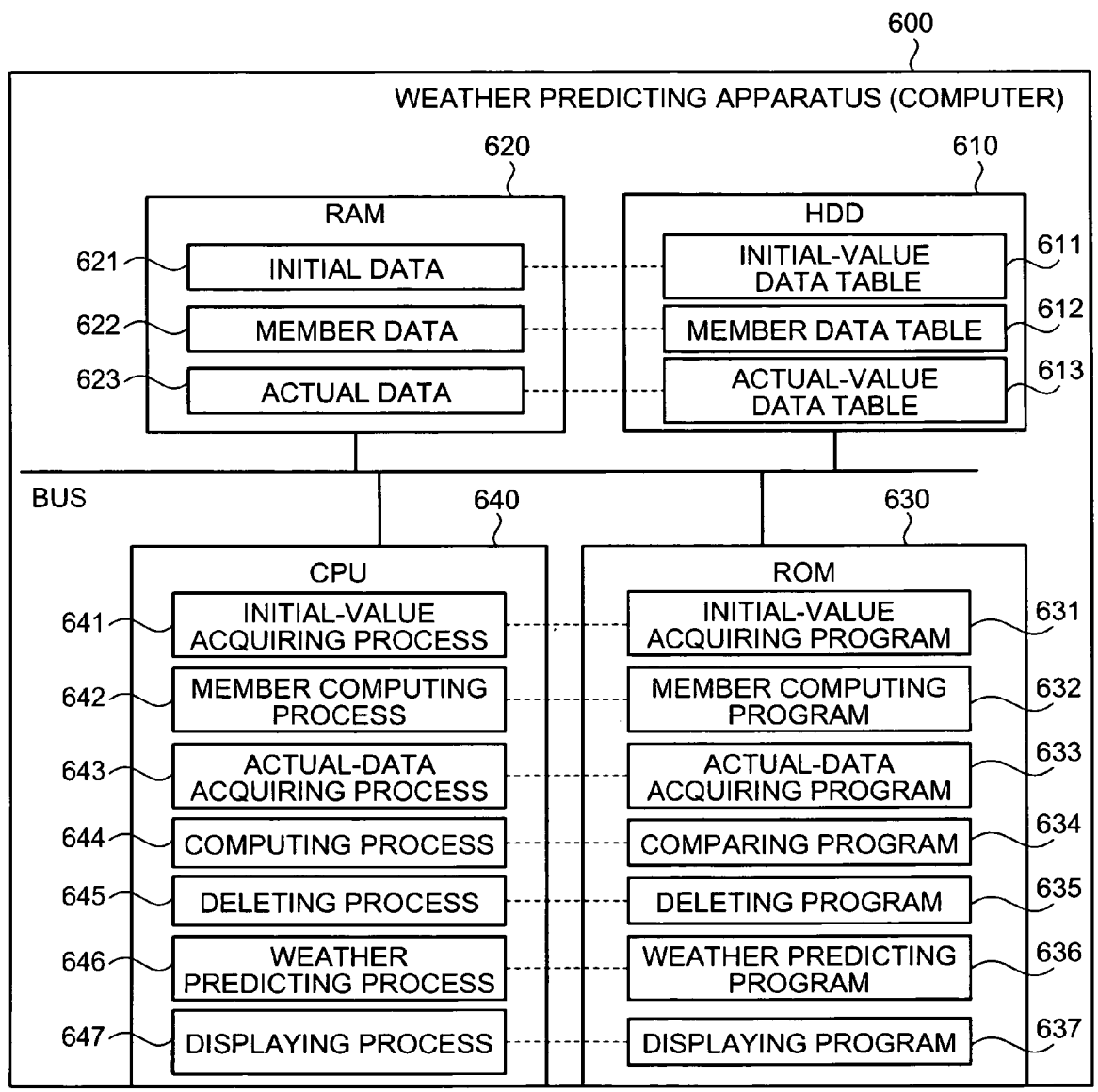
FIG. 14 is a block diagram of a computer that executes a computer program for the weather prediction.

The processes explained above can be realized by executing a computer program on a computer. FIG. 14 is a block diagram of the computer that executes a computer program for the weather prediction.

A computer 600 functions as the weather predicting apparatus. The computer 600 includes a hard disk drive (HDD) 610, a random access memory (RAM) 620, a read only memory (ROM) 630, and a CPU 640, each connected by a bus 650.

The ROM 630 stores therein an initial-value acquiring program 631, a member computing program 632, an actual-value acquiring program 633, a comparing program 634, a deleting program 635, a weather predicting program 636, and a displaying program 637, all of which are combined to function as the weather predicting apparatus 10. The programs 631 to 635 can be integrated or separated arbitrarily.

The CPU 640 reads the computer programs 631 to 637 from the ROM 630 and executes them, whereby the computer programs 631 to 637 function as an initial-value acquiring process 641, a member computing process 642, an actual-value acquiring process 643, a comparing process 644, a deleting process 645, a weather predicting process 646, and a displaying process 647 respectively. The processes 641 to 647 correspond to the initial-value acquiring unit 14a, the member computing unit 14b, the actual-value acquiring unit 14c, the comparing unit 14d, the deleting unit 14e, the weather predicting unit 14f, and the display unit 14g respectively.

The HDD 610 includes an initial-value data table 611, a member data table 612, and an actual-value data table 613. The initial-value data table 611 corresponds to the initial value database 15a, the member data table 612 corresponds to the member database 15b, and the actual-value data table 613 corresponds to the actual value database 15c. The CPU 640 registers data to the initial-value data table 611, the member data table 612, and the actual-value data table 613; reads an initial value data 621, a member data 622, and an actual value data 623 from each of the tables 611, 612, and 613; stores the data in the RAM 620; and performs the weather prediction process based on the initial value data 621, the member data 622, and the actual value data 623.

According to the embodiments, the weather predicting apparatus 10 computes predictions at the predetermined time intervals from the certain time point in the past; acquires actual values through actual observations at the predetermined time intervals; compares each member with the corresponding actual value; determines whether the difference between the two is within the predetermined tolerance; and deletes the initial value of the member whose error is determined to be out of the tolerance. As a result of deleting inaccurate members based on the actual value, amounts of the CPU time for the computation, network load, and the data are reduced and the accuracy of the weather prediction is improved.

Moreover, while errors tend to increase as the weather is predicted into farther future, the weather predicting apparatus 10 uses an expanded tolerance for the weather prediction at a farther time point in the future. This prevents the initial value of an accurate member from being deleted.

Furthermore, because the weather predicting apparatus 10 outputs to a predetermined output unit the number of the computed results whose prediction errors are determined to be out of the tolerance, the number of deleted members are displayed to indicate the reliability of the weather prediction.

Moreover, a warning is issued either when the number of the results with the out of the tolerance prediction error exceeds a predetermined threshold, or when the prediction error exceeds a predetermined threshold. In this manner, the weather predicting apparatus 10 notifies the user that the weather prediction is difficult.

Thus, according to the embodiments, the weather prediction can be performed accurately and speedily.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A computer-readable recording medium that stores therein a computer program that causes a computer to execute an ensemble weather predicting method comprising:

substituting a plurality of different initial values into a weather prediction model at a predetermined time point to start computing predicted values for each time point between a first time point prior to the predetermined time point and an N-th time point subsequent to the predetermined time point with respect to each initial value, wherein N is a positive integer;

comparing, at an arbitrary time point during the computation, each predicted value for a past time point prior to the arbitrary time point that has been computed with respect to the plurality of different initial values with an actual value actually observed at the past time point and determining whether a difference between each predicted value and the actual value is within a first tolerance;

substituting remaining initial values of the plurality of different initial values other than the initial value corresponding to any predicted value for which the difference has been determined to be not within the first tolerance into the weather prediction model for any remaining computation of predicted values performed after the arbitrary time point.

2. The computer-readable recording medium according to claim 1, wherein the method further comprises:

outputting a number of initial values for which it is determined that the difference is out of the first tolerance.

3. The computer-readable recording medium according to claim 1, wherein the method further comprises:

issuing a warning when a number of initial values for which it is determined that the difference is out of the first tolerance exceeds a first threshold, or when the difference exceeds a second threshold.

4. The computer readable recording medium according to claim 1, wherein the method further comprises:

repeating the comparison, the determination, and the substitution of the remaining initial values until the computation of predicted Values for the N-th time point is completed.

5. The computer-readable recording medium according to claim 4, wherein the method further comprises:

determining whether each difference between an actual value actually observed at a past time point and each predicted value for the past time point is within a second tolerance wider than the first tolerance for the repeated steps performed at a later time point after the arbitrary time point.

6. An ensemble weather predicting apparatus comprising:

a computing unit that substitutes a plurality of different initial values into a weather prediction model at a predetermined time point to start computing predicted values for each time point between a first time point prior to the predetermined time point and N-th time point subsequent to the predetermined time point with respect to each initial value, wherein N is a positive integer; and a comparing unit that compares, at an arbitrary time point during the computation each predicted value for a past time point prior to the arbitrary time point that has been computed with respect to the plurality of different initial values with an actual value actually observed at the past time point and determines whether a difference between each predicted value and the actual value is within a first tolerance; wherein the computing unit substitutes remaining initial values of the plurality of different initial values other than the initial value corresponding to any predicted value for which the difference has been determined to be not within the first tolerance into the weather prediction model for any remaining computation of predicted values performed after the arbitrary time point.

7. The computer readable recording medium according to claim 6, wherein the method further comprises:

repeating the comparison, the determination, and the substitution of the remaining initial values until the computation of predicted Values for the N-th time point is completed.

8. An ensemble weather predicting method comprising:

substituting a plurality of different initial values into a weather prediction model at a predetermined time point to start computing predicted values for each time point between a first time point prior to the predetermined time point and an N-th time point subsequent to the predetermined time point with respect to each initial value, wherein N is a positive integer;

comparing, at an arbitrary time point during the computation, each predicted value for a past time point prior to the arbitrary time point that has been computed with respect to the plurality of different initial values with actual value actually observed at the past time point and determining whether a difference between each predicted values and the actual values is within a first tolerance;

substituting remaining initial values of the plurality of different initial values other than the initial value corresponding to any predicted values for with the difference he been determined to be not within the first tolerance into the weather prediction model for any remaining computation of predicted values performed after the arbitrary time point.

9. The computer readable recording medium according to claim 8, wherein the method further comprises:

repeating the comparison, the determination, and the substitution of the remaining initial values until the computation of predicted values for the N-th time point is completed.

* * * * *

UNITED STATES PATENT AND TRADEMARK OFFICE
CERTIFICATE OF CORRECTION

PATENT NO. : 7,529,623 B2  Page 1 of 1
APPLICATION NO. : 11/489563
DATED : May 5, 2009
INVENTOR(S) : Shuichi Tanahashi It is certified that error appears in the above-identified patent and that said Letters Patent is hereby corrected as shown below:

Column 9, Line 7, change "Values" to --values--.

Column 10, Line 7, change "Values" to --values--.

Column 10, Line 21, before "actual" insert --an--.

Column 10, Line 23, before "and" change "values" to --value--.

Column 10, Line 23, before "is" change "values" to --value--.

Column 10, Line 27, change "values" to --value--.

Column 10, Line 27, change "with" to --which--.

Column 10, Line 28, change "he" to --has--.

Signed and Sealed this

Twenty-first Day of July, 2009

JOHN DOLL
*Acting Director of the United States Patent and Trademark Office*